(12) United States Patent
Cassidy et al.

(10) Patent No.: US 7,960,316 B2
(45) Date of Patent: Jun. 14, 2011

(54) CORROSION INHIBITOR INTENSIFIER COMPOSITIONS AND ASSOCIATED METHODS

(75) Inventors: Juanita M. Cassidy, Duncan, OK (US); Jim L. Lane, Duncan, OK (US); Chad E. Kiser, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 72 days.

(21) Appl. No.: 12/566,969

(22) Filed: Sep. 25, 2009

(65) Prior Publication Data

US 2011/0077174 A1  Mar. 31, 2011

(51) Int. Cl.
  *C23F 11/14* (2006.01)
  *C23F 11/16* (2006.01)
  *C09K 8/60* (2006.01)
  *C09K 8/584* (2006.01)

(52) U.S. Cl. ........ 507/243; 507/242; 507/247; 507/251; 507/252; 507/937

(58) Field of Classification Search .................. 507/243, 507/242, 247, 251, 252, 939
See application file for complete search history.

(56) References Cited

U.S. PATENT DOCUMENTS

| | | | | |
|---|---|---|---|---|
| 5,089,153 A | * | 2/1992 | Williams et al. .............. | 507/240 |
| 5,366,643 A | | 11/1994 | Walker | |
| 5,697,443 A | * | 12/1997 | Brezinski et al. ............ | 166/307 |
| 6,117,364 A | * | 9/2000 | Vorderbruggen et al. .... | 252/395 |

FOREIGN PATENT DOCUMENTS

| | | |
|---|---|---|
| EP | 0 559 305 A2 | 9/1993 |
| JP | 57 79181 A | 5/1982 |
| WO | WO 2008/016662 A2 | 2/2008 |

OTHER PUBLICATIONS

International Search Report and Written Opinion for PCT/GB2010/001785 dated Dec. 3, 2010.

* cited by examiner

*Primary Examiner* — Timothy J. Kugel
*Assistant Examiner* — Atnaf Admasu
(74) *Attorney, Agent, or Firm* — Robert A. Kent; McDermott Will & Emery LLP

(57) ABSTRACT

At least in aspect, the invention provides methods that include a method comprising: contacting a metal surface with an acidic fluid comprising an aqueous base-fluid, an acid, a corrosion inhibitor, and a corrosion inhibitor intensifier composition comprising an intensifier compound that corresponds to the following formula:

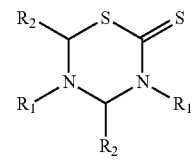

wherein $R_1$ is a methyl or ethyl group, and $R_2$ is H or an alkyl, aryl, alkyl aryl, alkylthio aryl, alkyloxy aryl, halogenated aryl, phenyl, alkyl phenyl, alkylthio phenyl, alkyloxyphenyl, or a halogenated phenyl group.

15 Claims, No Drawings

CORROSION INHIBITOR INTENSIFIER COMPOSITIONS AND ASSOCIATED METHODS

BACKGROUND

The present invention relates to methods and compositions for corrosion inhibition. More particularly, in one or more embodiments, the present invention relates to corrosion inhibitor intensifier compositions that may be useful, inter alia, for enhancing the inhibition of metal corrosion in acidic environments, for example, those encountered in subterranean operations such as hydrocarbon recovery, and associated methods of use. The corrosion inhibitor intensifiers of the present invention may be used effectively in sour conditions.

Acidic fluids may be present in a multitude of operations in the oil and chemical industries. In these operations, metal surfaces in piping, tubing, heat exchangers, and reactors may be exposed to acidic fluids. Acidic fluids are often used as a treating fluid in wells penetrating subterranean formations. Such acidic treatment fluids may be used in, for example, clean-up operations or stimulation operations for oil and gas wells. Acidic stimulation operations may use these treatment fluids in hydraulic fracturing and matrix acidizing treatments. As used herein, the term "treatment fluid" refers to any fluid that may be used in an application in conjunction with a desired function and/or for a desired purpose. The term "treatment" does not imply any particular action by the fluid or any component thereof.

Acidizing and fracturing treatments using aqueous acidic treatment fluids commonly are carried out in hydrocarbon-containing subterranean formations penetrated by a well bore to accomplish a number of purposes, one of which is to increase the permeability of the formation. The increase in formation permeability normally results in an increase in the recovery of hydrocarbons from the formation. In acidizing treatments, generally aqueous acidic treatment fluids are introduced into the subterranean formation under pressure so that the acidic solution flows into the pore spaces of the formation. The acidic treatment fluid reacts with acid-soluble materials contained in the formation, resulting in an increase in the size of the pore spaces and an increase in the permeability of the formation. In fracture-acidizing treatments, one or more fractures are produced or enhanced in the formation, and the acidic treatment fluid is introduced into the fracture to etch flow channels in the fracture face. The acid also enlarges the pore spaces in the fracture face and in the formation.

The rate at which acidizing fluids react with reactive materials in the subterranean formation is a function of various factors, including, but not limited to, acid concentration, temperature, fluid velocity, and the type of reactive material encountered. Whatever the rate of reaction of the acidizing fluid, the fluid can be introduced into the formation only a certain distance before it becomes spent. It is desirable to maintain the acidizing fluid in a reactive condition for as long a period of time as possible to maximize the permeability enhancement produced by the acidizing fluid.

A common problem associated with using acidic treatment fluids in subterranean formations is the corrosion of the tubular goods in the well bore and the other equipment used to carry out the treatment. As used herein, the term "corrosion" refers to any reaction between a material and its environment that causes some deterioration of the material or its properties. Examples of common types of corrosion include, but are not limited to, the rusting of metal, the dissolution of a metal in an acidic solution, and patina development on the surface of a metal. The expense of repairing or replacing corrosion damaged equipment is high. The corrosion problem may be exacerbated by the elevated temperatures encountered in deeper formations. The increased corrosion rate of the ferrous and other metals making up the tubular goods and other equipment results in quantities of the acidic solution being neutralized before it enters the subterranean formation. The partial neutralization of the acid results in the production of quantities of metal ions which are highly undesirable in the subterranean formation. Acidic treatment fluids may include a variety of acids such as, for example, hydrochloric acid, formic acid, hydrofluoric acid, and the like. While acidic treatment fluids may be useful for a variety of downhole operations, acidic treatment fluids can be problematic in that they can cause corrosion to downhole production tubing, downhole tools, and other surfaces in a subterranean formation.

To combat potential corrosion problems, an assortment of corrosion inhibitors has been used to reduce or prevent corrosion to downhole metals and metal alloys with varying levels of success. As used herein, the term "inhibit" and its derivatives refer to lessening the tendency of a phenomenon to occur and/or the degree to which that phenomenon occurs. The term "inhibit" does not imply any particular degree or amount of inhibition. A difficulty encountered with the use of some corrosion inhibitors is the limited temperature range over which they may function effectively. For instance, certain conventional antimony-based inhibitor formulations have been limited to temperatures above 270° F. and do not appear to function effectively below this temperature.

Corrosion inhibitor intensifiers have been used to extend the performance range of a selected acid corrosion inhibitor. As used herein, the term "corrosion inhibitor intensifier" refers to compounds that are capable of enhancing the performance of a selected acid corrosion inhibitor. Unfortunately, most intensifiers do not perform universally with all corrosion inhibitors and many have temperature, time, and environmental drawbacks. For instance, formic acid, which is sometimes used as a corrosion inhibitor intensifier, is limited by a temperature range in which it performs of about 250° F. up to about 325° F. in 15% HCl. Potassium iodide is another intensifier that is sometimes used. It also has temperature limitations of about 325° F. that limit its usefulness. Additionally, some intensifiers, such as antimony-based intensifiers, can be used in conjunction with 15% HCl, but not with stronger acids such as 28% HCl. Another intensifier, cuprous iodide, is effective up to about 350° F., but has limited solubility in acid solutions. Additionally, cuprous iodide contains copper, a banned substance in some areas due to environmental considerations. As the older shallow and less corrosive oil and gas wells deplete, higher strength and more corrosion resistant materials or better corrosion inhibitors and intensifiers are needed to allow for deeper drilling in more corrosive environments.

It is beneficial to use alloys of increasing corrosion resistance and strength in subterranean applications. These increasing demands arise from factors including: deep wells that involve higher temperatures and pressures; enhanced recovery methods such as steam or carbon dioxide ($CO_2$) injection; increased tube stresses especially offshore; and corrosive well constituents including: hydrogen sulfide ($H_2S$), $CO_2$ and chlorides. Materials selection is especially critical for sour conditions, which are those having $H_2S$ present. Sour well environments are highly toxic and extremely corrosive to traditional carbon steel oil and gas alloys. In some sour environments, corrosion can be controlled by using inhibitors along with carbon steel tubulars.

The inhibitors, however, involve continuing high cost and are often unreliable at high temperatures. Additionally, conventional inhibitors are generally not thought to be effective in sour conditions.

SUMMARY

The present invention relates to methods and compositions for corrosion inhibition. More particularly, in one or more embodiments, the present invention relates to corrosion inhibitor intensifier compositions that may be useful, inter alia, for enhancing the inhibition of metal corrosion in acidic environments, for example, those encountered in subterranean operations such as hydrocarbon recovery, and associated methods of use. The corrosion inhibitor intensifiers of the present invention may be used effectively in sour conditions.

In one embodiment, the present invention provides a method comprising: contacting a metal surface with an acidic fluid comprising an aqueous base-fluid, an acid, a corrosion inhibitor, and a corrosion inhibitor intensifier composition comprising an intensifier compound that corresponds to the following formula:

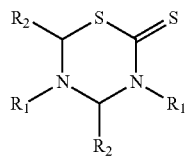

wherein $R_1$ is a methyl or ethyl group, and $R_2$ is H or an alkyl, aryl, alkyl aryl, alkylthio aryl, alkyloxy aryl, halogenated aryl, phenyl, alkyl phenyl, alkylthio phenyl, alkyloxyphenyl, or a halogenated phenyl group.

In one embodiment, the present invention provides a method comprising: introducing an acidic fluid into a well bore via a metal conduit, wherein the acidic fluid comprises an aqueous-base fluid, an acid, a corrosion inhibitor, and a corrosion inhibitor intensifier composition comprising a compound that corresponds to a formula

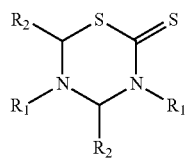

wherein $R_1$ is a methyl or ethyl group, and $R_2$ is H or an alkyl, aryl, alkyl aryl, alkylthio aryl, alkyloxy aryl, halogenated aryl, phenyl, alkyl phenyl, alkylthio phenyl, alkyloxyphenyl, or a halogenated phenyl group.

In another embodiment, the present invention provides a corrosion inhibitor composition comprising: a corrosion inhibitor; and a corrosion inhibitor intensifier composition comprising a compound that corresponds to a formula

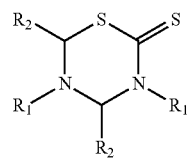

wherein $R_1$ is a methyl or ethyl group, and $R_2$ is H or an alkyl, aryl, alkyl aryl, alkylthio aryl, alkyloxy aryl, halogenated aryl, phenyl, alkyl phenyl, alkylthio phenyl, alkyloxyphenyl, or a halogenated phenyl group.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods and compositions for corrosion inhibition. More particularly, in one or more embodiments, the present invention relates to corrosion inhibitor intensifier compositions that may be useful, inter alia, for enhancing the inhibition of metal corrosion in acidic environments, for example, those encountered in subterranean operations such as hydrocarbon recovery, and associated methods of use. The corrosion inhibitor intensifiers of the present invention may be used effectively in sour conditions.

One of the many advantages of the present invention (many of which are not alluded to herein) is that the corrosion inhibitor intensifier compositions of the present invention may be more effective than corrosion inhibitors and intensifiers heretofore used and/or may possess desirable performance when used in sour conditions. Another potential advantage of the corrosion inhibitor intensifier compositions of the present invention is that they may be more effective with respect to certain time and temperature ranges over other intensifiers.

The corrosion inhibitor intensifier compositions of the present invention comprise an intensifier compound corresponding to Formula 1 below:

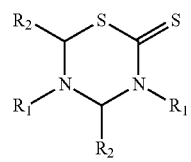

Formula 1 wherein $R_1$ is a methyl or ethyl group, and $R_2$ is H or an alkyl, aryl, alkyl aryl, alkylthio aryl, alkyloxy aryl, halogenated aryl, phenyl, alkyl phenyl, alkylthio phenyl, alkyloxyphenyl, or a halogenated phenyl group. Examples of $R_2$ include, but are not limited to, p-methoxyphenyl, m-methoxyphenyl, o-methoxyphenyl, p-methylphenyl, m-methylphenyl, p-ethoxyphenyl, p-fluorophenyl, p-isopropylphenyl, p-phenoxyphenyl, p-methylthiophenyl, 2,4-dimethoxyphenyl, 3,4-methylenedioxyphenyl, 3,4,5-trimethoxyphenyl, 2,3-dimethoxyphenyl, 2,5-dimethylphenyl, p-bromophenyl, m-phenoxyphenyl, 1-naphthyl, and p-t-butylphenyl.

Tetrahydro-3,5-dimethyl-2H-1,3,5-thiadiazine-2-thione is an example of a preferred intensifier compound. This is commercially available as "MYACIDE® DZ" or "PROTEC- TOL® DZ" from BASF in various locations. Tetrahydro-3,5-dimethyl-2H-1,3,5-thiadiazine-2-thione is thought to be effective at both sweet and sour conditions as a corrosion inhibitor intensifier.

In certain embodiments, a corrosion inhibitor intensifier composition may be combined with a corrosion inhibitor and then added to a treatment fluid, such as an acidic treatment fluid. In certain embodiments, a corrosion inhibitor intensifier composition may be included in an acidic treatment fluid, wherein the acidic treatment fluid comprises an acid, a corrosion inhibitor, and the corrosion inhibitor intensifier composition.

As set forth above, the corrosion inhibitor intensifier compositions of the present invention may be included in an acidic treatment fluid. Generally, the treatment fluids of the present invention may comprise an aqueous-base fluid, an acid, a corrosion inhibitor, and a corrosion inhibitor intensifier composition.

The corrosion inhibitor intensifier compositions of the present invention may be present in the treatment fluid in an amount in the range of about 0.001% to about 5% by weight of the treatment fluid. In some embodiments, the intensifier may be present in an amount in the range of about 0.1% to about 1% by weight of the treatment fluid. The amount used may vary depending on conditions present at the metal's surface, temperature, contact time, solubility of the corrosion inhibitor compound in the acid present, the acid strength, the composition of the corrosion inhibitor compound, and other factors relevant to those skilled in the art.

The aqueous-base fluids used in the treatment fluids of the present invention may comprise fresh water, saltwater (e.g., water containing one or more salts dissolved therein), brine, seawater, or combinations thereof. Generally, the water may be from any source, provided that it does not contain an excess of components that might undesirably affect the stability and/or performance of the treatment fluids. One of ordinary skill in the art, with the benefit of this disclosure, will recognize what components might undesirably affect the stability and/or performance of the treatment fluids of the present invention. In certain embodiments, the aqueous-base fluid may be emulsified into a nonaqueous fluid. The aqueous-base fluid may also be viscosified with an acid stable gelling agent, such as, for example, a polymer, which may also include a crosslinker. In certain embodiments, the aqueous-base fluid may also be foamed (e.g., may comprise a gas).

The acid that may be present in the acidic treatment fluids of the present invention may include, but is not limited to, organic acids, mineral acids (such as hydrochloric acid, hydrofluoric acid, and the like), and mixtures of these acids. In certain embodiments, hydrochloric acid may be present in a range of about 5% to 28% by weight of the treatment fluid. Additionally, a variety of weak acids can be used in accordance with embodiments of the present invention. Examples of suitable weak acids include, but are not limited to, formic acid, acetic acid, citric acid, glycolic acid, hydroxyacetic acid, lactic acid, hydrofluoric acid, 3-hydroxypropionic acid, carbonic acid, ethylenediaminetetraacetic acid, and mixtures of these acids. The acid may be present in an amount in the range of about 1% to about 37% by weight of the treatment fluid. In certain embodiments, the acid may be present in an amount in the range of about 5% to about 28% by weight of the treatment fluid. The amount of the acid(s) included in a particular treatment fluid of the present invention may depend upon, for example, the desired purpose or use of the treatment fluid, the particular acid used, as well as other components of the treatment fluid, and/or other factors that will be recognized by one of ordinary skill in the art with the benefit of this disclosure.

The acidic treatment fluids of the present invention further may include a corrosion inhibitor. Any of a variety of corrosion inhibitors may be suitable for use in the compositions and methods of the present invention. Examples of suitable corrosion inhibitors, include, but are not limited to, cinnamaldehyde compounds, acetylenic compounds, quaternary ammonium compounds, a condensation reaction product as set forth below, and combinations thereof. While the amount of corrosion inhibitor utilized in the practice of the present invention can vary over a substantial range, the corrosion inhibitor may present in an amount effective to inhibit corrosion by the acid on the metal surfaces to be protected. In certain embodiments, the corrosion inhibitor may be present in an amount of about 0.05% to about 3% by weight of the treatment fluid.

In certain embodiments, corrosion inhibitor compositions useful in the present invention may comprise a cinnamaldehyde compound. The term "cinnamaldehyde compound" as used herein refers to cinnamaldehyde and cinnamaldehyde derivatives. Cinnamaldehyde derivatives may include any compound that may act as a source of cinnamaldehyde in mixtures encountered during use of the corrosion inhibitors. Examples of cinnamaldehyde derivatives suitable for use in the present invention include, but are not limited to, dicinnamaldehyde, p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde, o-methylsulfate, p-thiocyanocinnamaldehyde, p-(S-acetyl)thiocinnamaldehyde, p-(S-N,N-dimethylcarbamoylthio)cinnamaldehyde, p-chlorocinnamaldehyde, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, α-bromo-p-cyanocinnamaldehyde, α-ethyl-p-methylcinnamaldehyde, p-methyl-α-pentylcinnamaldehyde, cinnamaloxime, cinnamonitrile, 5-phenyl-2,4-pentadienal, 7-phenyl-2,4,6-heptatrienal, and mixtures thereof.

Where used, the cinnamaldehyde compound may be present in an amount in the range of about 0.005% to about 5% by weight of the treatment fluid. In certain embodiments, cinnamaldehyde compound may be present in an amount in the range of about 0.02% to about 1% by weight of the treatment fluid.

In certain embodiments, the corrosion inhibitor compositions useful in the present invention may comprise an acetylenic compound. Acetylenic compounds suitable for use in the present invention may include acetylenic alcohols such as, for example, acetylenic compounds having the general formula: $R_7CCCR_8R_9OH$ wherein $R_7$, $R_8$, and $R_9$ are individually selected from the group consisting of hydrogen, alkyl, phenyl, substituted phenyl hydroxy-alkyl radicals. In certain embodiments, $R_7$ comprises hydrogen. In certain embodiments, $R_8$ comprises hydrogen, methyl, ethyl, or propyl radicals. In certain embodiments, $R_9$ comprises an alkyl radical having the general formula $C_nH_{2n}$, where n is an integer from 1 to 10. In certain embodiments, the acetylenic compound $R_7CCCR_8R_9OR_{10}$ may also be used where $R_{10}$ is a hydroxy-alkyl radical. Examples of acetylenic alcohols suitable for use in the present invention include, but are not limited to, methyl butynol, methyl pentynol, hexynol, ethyl octynol, propargyl alcohol, benzylbutynol, ethynylcyclohexanol, ethoxy acetylenics, propoxy acetylenics, and mixtures thereof. Examples of suitable alcohols include, but are not limited to, hexynol, propargyl alcohol, methyl butynol, ethyl octynol, propargyl alcohol ethoxylate (e.g., Golpanol PME), propargyl alcohol propoxylate (e.g., Golpanol PAP), and mixtures thereof. When used, the acetylenic compound may be present in an amount of about 0.01% to about 10% by weight of the treatment fluid. In certain embodiments, the acetylenic compound may be present in an amount of about 0.1% to about 1.5% by weight of the treatment fluid.

In certain embodiments, corrosion inhibitor compositions useful in the present invention may comprise a quaternary ammonium compound. Examples of quaternary ammonium compounds suitable for use in the present invention include, but are not limited to, N-alkyl, N-cycloalkyl and N-alkylarylpyridinium halides such as N-cyclohexylpyridinium bromide or chloride, N-alkyl, N-cycloalkyl and N-alkylarylquinolinium halides such as N-dodecylquinolinium bromide or chloride, the like and mixtures thereof.

In certain embodiments, corrosion inhibitor compositions useful in the present invention may optionally comprise a condensation reaction product. As referred to herein, the condensation reaction product in this blend is hereby defined to include the reaction product of effective amounts of one or more active hydrogen containing compounds with one or more organic carbonyl compound having at least one hydrogen atom on the carbon atom alpha to the carbonyl group and a fatty acid or other fatty compound or alkyl nitrogen heterocycles and preferably 2 or 4 alkyl substituted and an aldehyde, and, in certain embodiments, those aldehydes that may comprise aliphatic aldehydes containing from 1 to 16 carbons and aromatic aldehydes having no functional groups that are reactive under the reaction conditions other than aldehydes. The above ingredients may be reacted in the presence of an acid catalyst of sufficient strength to thereby form the reaction product. These condensation reaction products are described in more detail in U.S. Pat. No. 5,366,643, the entire disclosures of which are hereby incorporated by reference.

An example of one method of preparing the reaction product may be to react about 1 equivalent of active hydrogen compound and about 0.5 to about 10 equivalents of aldehyde and about 0.6 to about 10 equivalents of carbonyl compound and about 0.8 to about 1.2 equivalents of mineral acid catalyst with about 0.15 to about 10 equivalents of fatty compound at a temperature in the range of about 140° F. to about 240° F. for a time in the range of about 4 to about 48 hours. Upon completion of the reaction, additional fatty material may be added with stirring to bring the ratio of fatty material to a level of about 2 to about 20 equivalents.

In some embodiments, the reaction product may be present in the range of about 3% to about 75% by weight of the corrosion inhibitor. In certain embodiments, the reaction product may be present in an amount in the range of about 15% to about 30% by weight of the corrosion inhibitor.

In certain embodiments, combinations of the corrosion inhibitors disclosed herein, as well as additional corrosion inhibitor compounds and corrosion inhibitor intensifiers, may be used. Additional corrosion inhibitor components, such as solvents, surfactants, and other corrosion inhibitor intensifiers that may be suitable are further discussed in U.S. Pat. No. 5,697,443 and U.S. Pat. No. 5,591,381, the entire disclosures of which are hereby incorporated by reference.

The treatment fluids of the present invention optionally may include one or more of a variety of additives, such as salts, surfactants, solvents, scale inhibitors, organic corrosion inhibitors, catalysts, clay stabilizers, friction reducers, gases, foaming agents, iron control agents, solubilizers, pH adjusting agents (e.g., buffers), and the like. Combinations of these may be used as well. Those of ordinary skill in the art, with the benefit of this disclosure, will be able to determine the appropriate additives for a particular application.

The acidic treatment fluids of the present invention may be prepared using any of a variety of suitable techniques. For example, the acidic treatment fluids may be prepared by blending at least the aqueous-base fluid and the acid to provide an acidic treatment fluid of a desired acid concentration. The corrosion inhibitor and the corrosion inhibitor intensifier composition may then be blended with the acidic treatment fluid in a desired amount. As set forth above, the corrosion inhibitor intensifier composition may be premixed with the corrosion inhibitor prior to preparation of the acidic treatment fluid, in accordance with embodiments of the present invention. If desired, the treatment fluids of the present invention can be prepared in any suitable tank equipped with suitable mixing means. The treatment fluids may be transferred either at a controlled rate directly into a well bore or into a convenient storage tank for injection down a well bore, in accordance with embodiments of the present invention.

In some embodiments, the treatment fluid may be an emulsion.

In some embodiments, the acidic treatment fluid may be introduced into a subterranean formation whereby either foreign material in the well bore or in the formation or formation materials are dissolved to thereby increase the permeability of the formation (e.g., in an acidizing treatment). The increased permeability generally should permit better flow of hydrocarbon fluids through the formation and into its well bore. The pumping rate and pressure utilized will depend upon, for example, the characteristics of the formation and whether or not fracturing of the formation is desired. After the treatment fluid has been placed in the formation, the well may be shut in and allowed to stand for a period of several hours or more depending on the type of acid employed and the formation treated. If there is pressure on the well, pressure then can be released and the spent or at least partially spent acidic treatment fluid, containing salts formed by the reaction of the acid, is permitted to flow back into the well bore and is pumped or flowed to the surface for appropriate disposal, in accordance with embodiments of the present invention. The well then may be placed on production or used for other purposes.

Generally, some of the methods of the present invention involve inhibiting the corrosion of a portion of a metal surface. The methods of the present invention may be employed in a variety of applications, including those conducted in subterranean formations. In one embodiment, the present invention provides a method comprising: contacting a metal surface with a treatment fluid comprising an aqueous-base fluid, an acid, a corrosion inhibitor, and a corrosion inhibitor intensifier composition comprising a compound that corresponds to a Formula 1 above as described herein. The metals suitable for use with the corrosion inhibitor intensifier compounds of the present invention include ferrous-based metals such as iron and alloys of iron, for example, N-80, J-55, 13Cr and 22Cr, and non-ferrous metals such as nickel, and copper, and their alloys. Other metals that can be protected from corrosion by the present invention are also contemplated. Such metal surfaces may be part of downhole piping, downhole tools, and the like.

To facilitate a better understanding of the present invention, the following examples of certain aspects of some embodiments are given. In no way should the following examples be read to limit, or define, the entire scope of the invention.

EXAMPLES

All weight loss tests were performed in Hastelloy B autoclaves. A pre-weighed corrosion coupon cut from N80 steel pipe, with a surface area of approximately 4.4 in$^2$, was immersed in 100 mL of a 15% or 28% by weight inhibited hydrochloric acid solution. The hydrochloric acid solution was inhibited with the inhibitor and intensifier described in Table 1, and was prepared by addition of the inhibitor and intensifier to de-ionized water, followed by addition of concentrated HCl necessary give the final wt % acid. In Table 2, an anti-cracking, and H$_2$S scavenger SCA-130 (commercially available from Halliburton) was added after the HCl. Additive volumes were subtracted from the water volume to determine a final volume of 100 mL fluid. All tests were run under static conditions. The autoclave was pressurized with N$_2$ to 1000 psi for tests run in Table 1. For tests run in Table 2, the autoclave was first pressurized with 10% H$_2$S followed by pressurization up to 1000 psi with N$_2$. Kerosene was used as a heat transfer fluid. At the completion of the three hour contact time the coupon was removed from the acid solution, cleaned and weighed. The corrosion loss was then reported in lb/ft$^2$.

Shown in Table 1 is data corresponding to weight loss corrosion tests that were performed with N$_2$.

TABLE 1

| Test No. | Corrosion Loss (lb/ft$^2$) | Temp. (° F.) | Acid | Time (hr) | Alloy | Inhibitor | Intensifier |
|---|---|---|---|---|---|---|---|
| 1 | 0.768 | 300 | 15% HCl | 3 | N80 | | MYACIDE DZ 0.3 g |
| 2 | 0.072 | 300 | 15% HCl | 3 | N80 | Cinnamaldehyde 2.0% | MYACIDE DZ 0.3 g |
| 3 | 0.749 | 300 | 15% HCl | 3 | N80 | Cinnamaldehyde 2.0% | |
| 4 | 0.013 | 200 | 28% HCl | 3 | N80 | Cinnamaldehyde 2.0% | MYACIDE DZ 0.3 g |
| 5 | 0.072 | 200 | 28% HCl | 3 | N80 | Cinnamaldehyde 2.0% | |

As can be seen in Table 1, it is believed that neither cinnamaldehyde nor the Myacide DZ give corrosion protection in 15% HCl at 300F, but when used together corrosion is reduced by a factor of 10. In 28% HCl the effect is not as great, but a significant reduction in corrosion loss is found with the use of Myacide DZ as a corrosion inhibitor intensifier with cinnamaldehyde inhibitor.

Shown in Table 2 is data corresponding to weight loss corrosion tests performed with 10% H$_2$S.

TABLE 2

| Test No. | Corrosion Loss (lb/ft$^2$) | Temp. (° F.) | Acid | Time (hr) | Alloy | Inhibitor | Intensifier | Additive |
|---|---|---|---|---|---|---|---|---|
| 1 | 0.116 | 300 | 15% HCl | 3 | N80 | | MYACIDE DZ 0.3 g | SCA-130 4.0% |
| 2 | 0.052 | 300 | 15% HCl | 3 | N80 | Cinnamaldehyde 2.0% | MYACIDE DZ 0.3 g | SCA-130 4.0% |
| 3 | 0.103 | 300 | 15% HCl | 3 | N80 | Cinnamaldehyde 2.0% | | SCA-130 4.0% |
| 4 | 0.782 | 300 | 15% HCl | 3 | N80 | | MYACIDE DZ 0.3 g | |
| 5 | 0.036 | 300 | 15% HCl | 3 | N80 | Cinnamaldehyde 2.0% | MYACIDE DZ 0.3 g | |
| 6 | 0.698 | 300 | 15% HCl | 3 | N80 | Cinnamaldehyde 2.6% | | |

As can be seen in Table 2, it is believed that the combination of cinnamaldehyde inhibitor with Myacide DZ intensifier results in lower corrosion losses in an H$_2$S environment than either cinnamaldehyde or Myacide DZ alone.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
    contacting a metal surface with an acidic fluid comprising an aqueous base-fluid, an acid, a corrosion inhibitor, and a corrosion inhibitor intensifier composition comprising an intensifier compound that corresponds to the following formula:

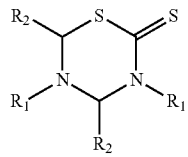

wherein $R_1$ is a methyl or ethyl group, and $R_2$ is H or an alkyl, aryl, alkyl aryl, alkylthio aryl, alkyloxy aryl, halogenated aryl, phenyl, alkyl phenyl, alkylthio phenyl, alkyloxyphenyl, or a halogenated phenyl group.

2. The method of claim 1 wherein $R_2$ comprises a halogen atom.

3. The method of claim 1 wherein the metal surface is located within a well bore that penetrates a subterranean formation.

4. The method of claim 1 wherein the acidic fluid is foamed or emulsified.

5. The method of claim 1 wherein the fluid is introduced into a subterranean formation as part of an acidizing treatment.

6. The method of claim 1 wherein the intensifier compound is tetrahydro-3,5-dimethyl-2H-1,3,5-thiadiazine-2-thione.

7. The method of claim 1 wherein the acid comprises an acid selected from the group consisting of an organic acid, a mineral acid, and any combination thereof.

8. The method of claim 1 wherein the corrosion inhibitor comprises at least one compound selected from the group consisting of a cinnamaldehyde compound, an acetylenic compound, a quaternary ammonium compounds, a condensation reaction product, and any combination thereof.

9. The method of claim 1 further comprising a step of combining at least the corrosion inhibitor intensifier composition and the corrosion inhibitor, prior to contacting a metal surface with an acidic fluid.

10. A method comprising:
    introducing an acidic fluid into a well bore via a metal conduit, wherein the acidic fluid comprises an aqueous-base fluid, an acid, a corrosion inhibitor, and a corrosion inhibitor intensifier composition comprising a compound that corresponds to a formula

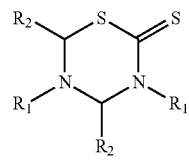

wherein $R_1$ is a methyl or ethyl group, and $R_2$ is H or an alkyl, aryl, alkyl aryl, alkylthio aryl, alkyloxy aryl, halogenated aryl, phenyl, alkyl phenyl, alkylthio phenyl, alkyloxyphenyl, or a halogenated phenyl group.

11. The method of claim 10 wherein the subterranean formation is sour.

12. The method of claim 10 wherein $R_2$ comprises a halogen atom.

13. The method of claim 10 wherein the intensifier compound is tetrahydro-3,5-dimethyl-2H-1,3,5-thiadiazine-2-thione.

14. The method of claim 10 wherein the corrosion inhibitor comprises at least one compound selected from the group consisting of a cinnamaldehyde compound, an acetylenic compound, a quaternary ammonium compounds, a condensation reaction product, and any combination thereof.

15. The method of claim 10 further comprising a step of combining at least the corrosion inhibitor intensifier composition and the corrosion inhibitor, prior to introducing an acidic fluid into a well bore via a metal conduit.

* * * * *